Aug. 31, 1926.
E. GASE
AUTOMATIC WEIGHING MACHINE
Filed Jan. 8, 1924   7 Sheets-Sheet 5
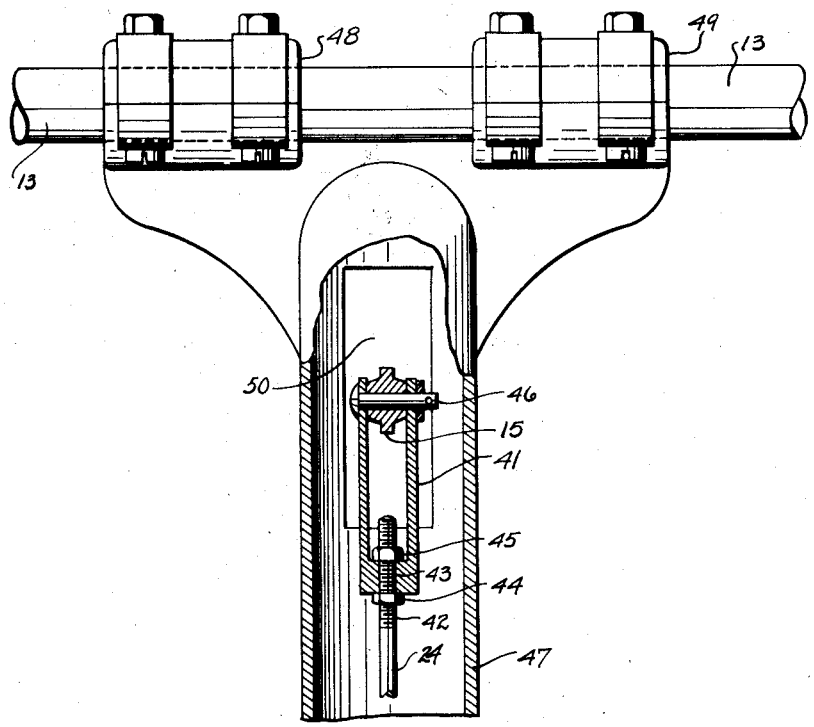
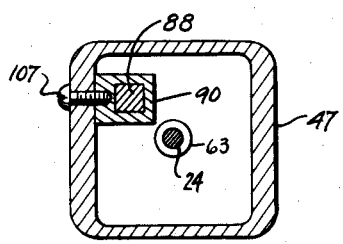
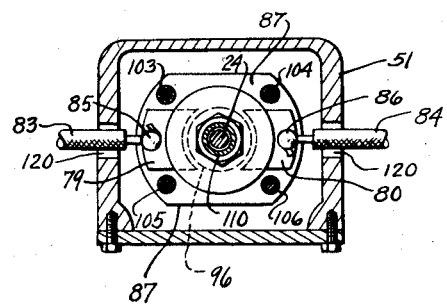
INVENTOR
Eugene Gase
BY
Newell and Spencer
ATTORNEYS Aug. 31, 1926. 1,598,128
E. GASE
AUTOMATIC WEIGHING MACHINE
Filed Jan. 8, 1924     7 Sheets-Sheet 6
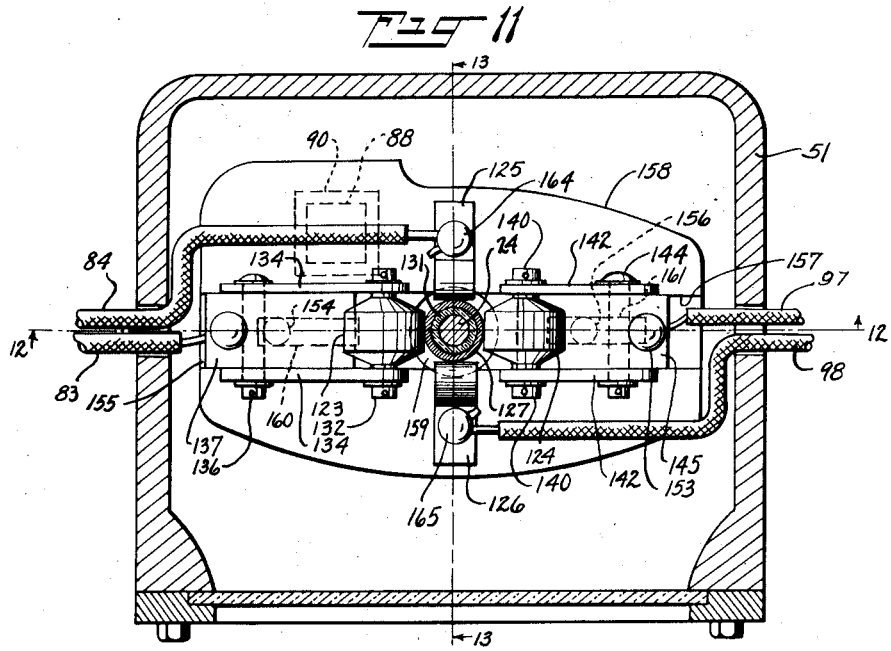
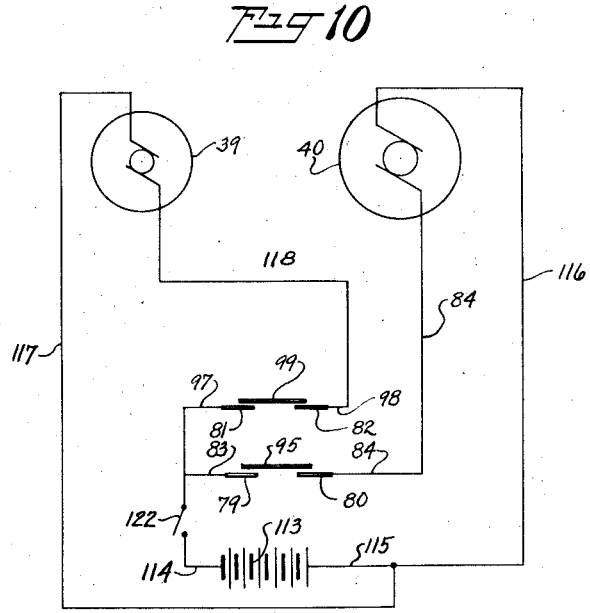
INVENTOR
Eugene Gase
BY
Newell and Spencer
ATTORNEYS Aug. 31, 1926.

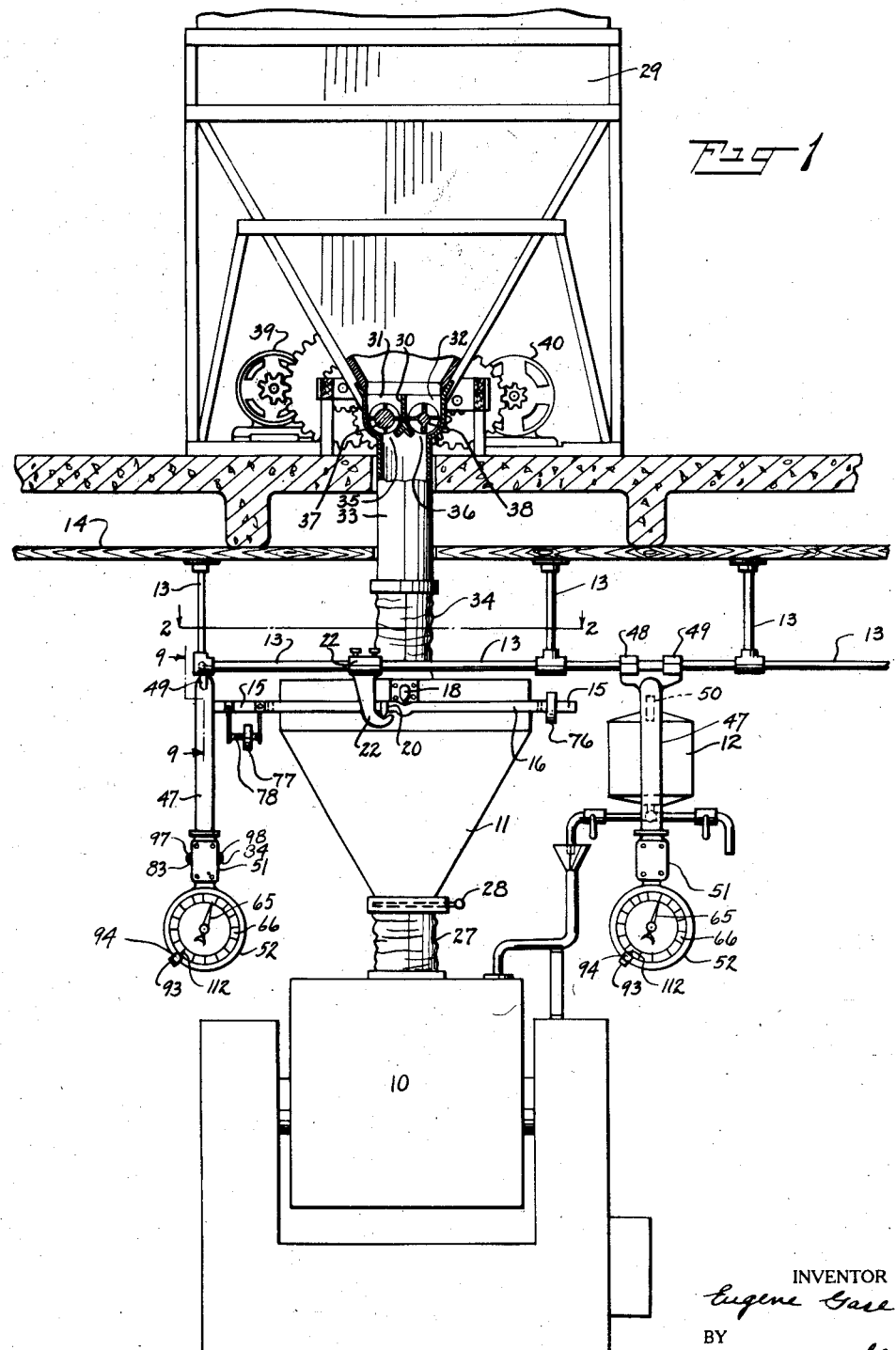

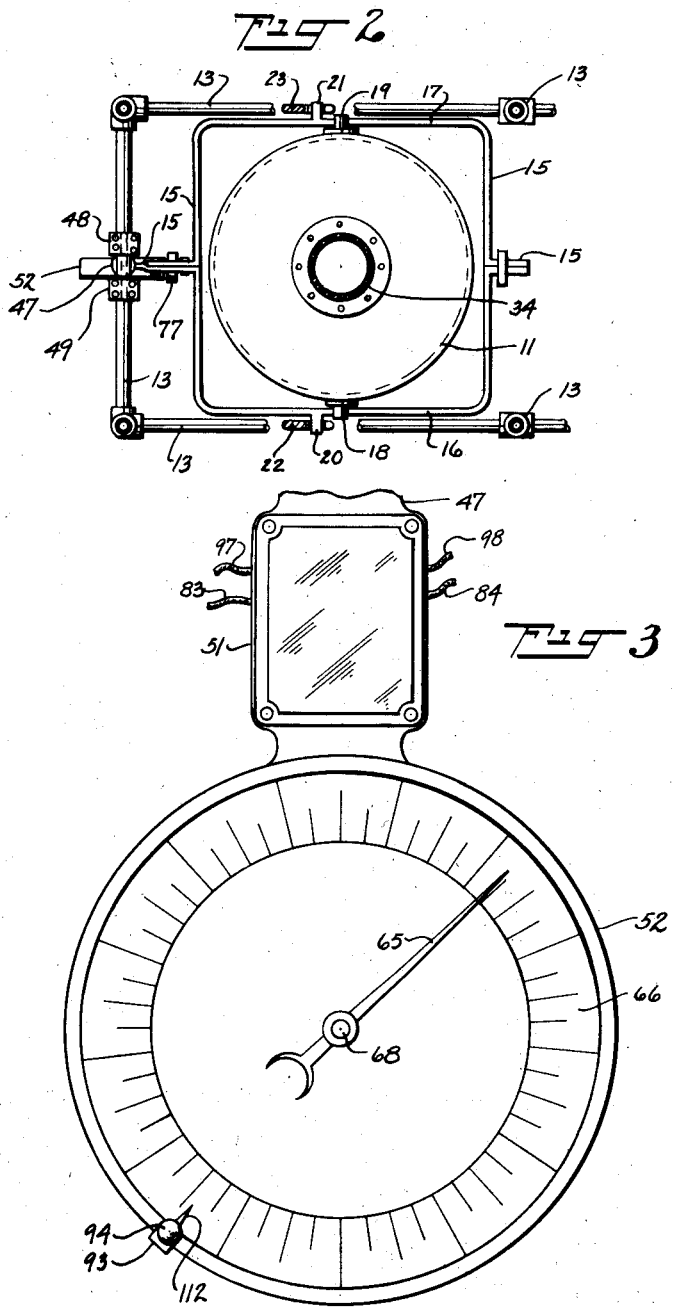

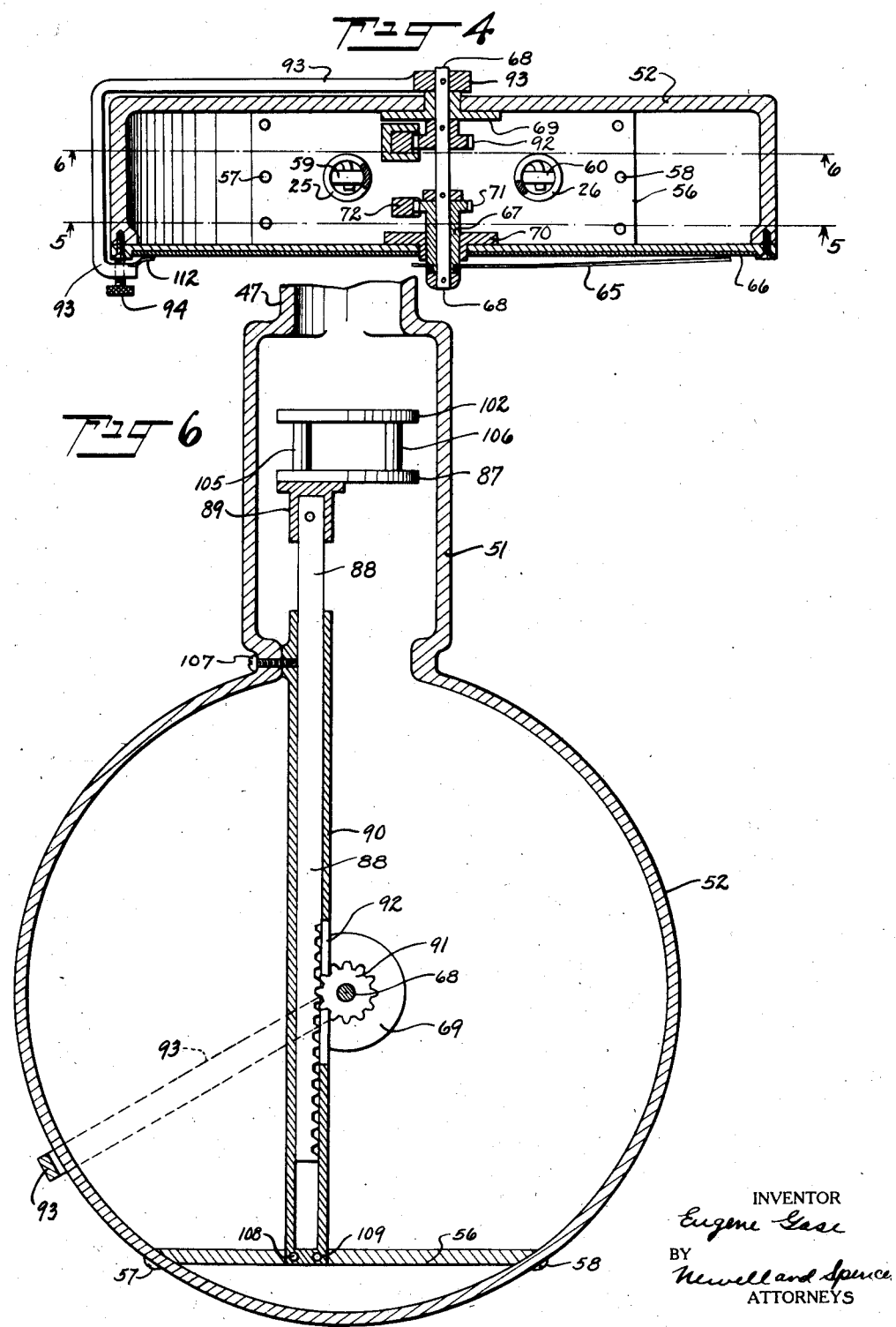

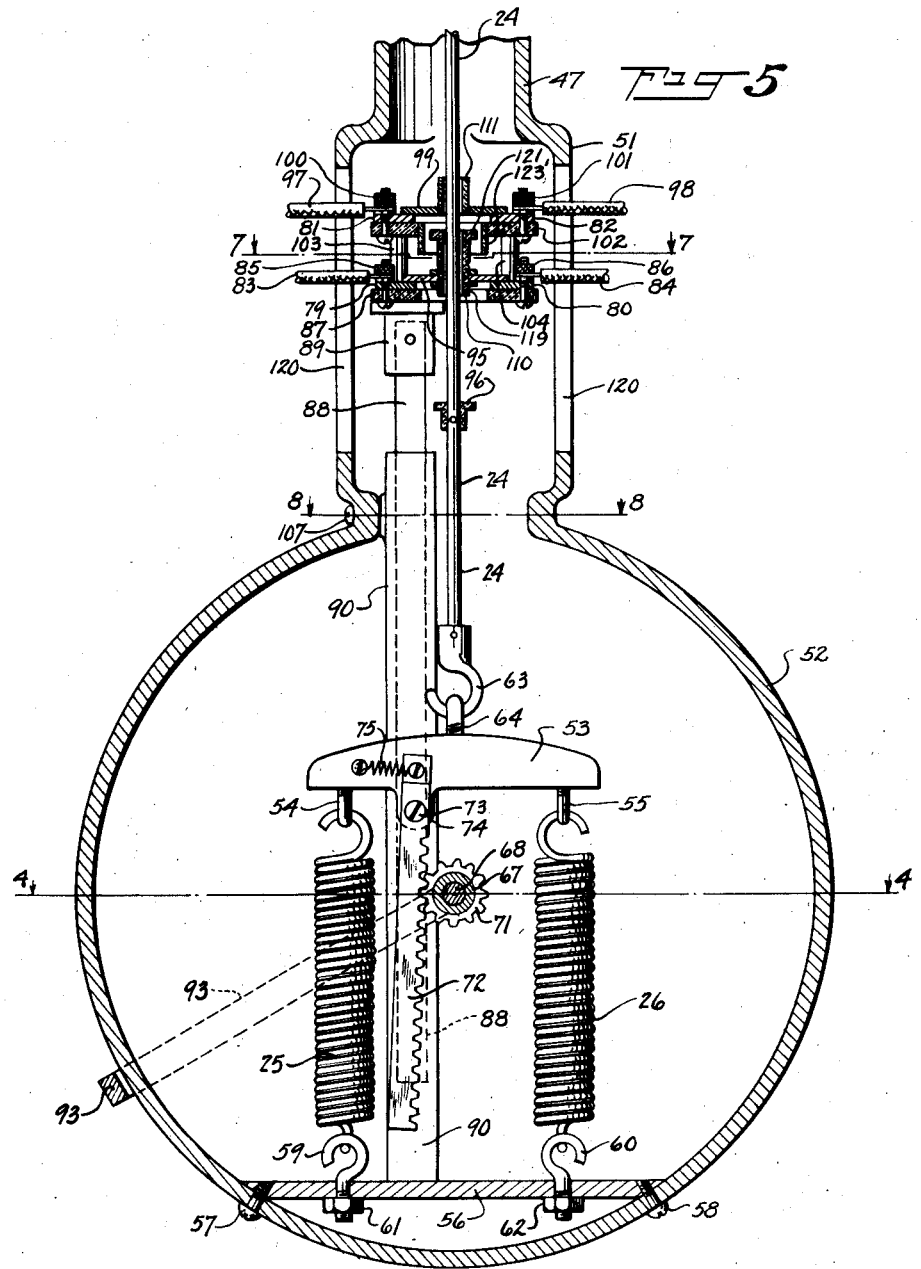

E. GASE 1,598,128

AUTOMATIC WEIGHING MACHINE

Filed Jan. 8, 1924  7 Sheets-Sheet 7

INVENTOR
Eugene Gase
BY
Newell and Spencer
ATTORNEYS

Patented Aug. 31, 1926.

1,598,128

UNITED STATES PATENT OFFICE.

EUGENE GASE, OF SAGINAW, MICHIGAN, ASSIGNOR TO BAKER-PERKINS COMPANY, INC., OF WHITE PLAINS, NEW YORK.

AUTOMATIC WEIGHING MACHINE.

Application filed January 8, 1924. Serial No. 684,942.

This invention relates to weighing machines, and more particularly to automatic weighing machines in which a supply of material to be weighed is automatically controlled and cut off when a predetermined amount has been attained.

It is the primary object of the present invention to provide an improved automatic weighing machine in which material may be rapidly and easily weighed and in which the weighing operation may be carried on with greater facility than has heretofore been accomplished.

Another object of the invention is to provide means for automatically feeding material to be weighed to a weighing machine, in which the rate of supply is under control and may be varied within limits to attain any desired rate of supply.

Another object of the invention is to provide means in connection with a weighing machine for automatically discontinuing the supply of material to the weighing hopper thereof after a predetermined amount has been supplied to the hopper.

A further object of the invention is to provide a weighing machine in which a large quantity of material may be accurately weighed in a comparatively short interval of time, by supplying the material to be weighed to the weighing hopper of the machine at a predetermined rapid rate for a certain time interval and thereafter supplying the material at a diminished rate until the desired amount of material has been supplied and the weighing operation has been completed.

With these and other objects in view, the invention comprises the various features hereinafter described and more particularly defined in the claims.

The present invention, although adapted to be applied to the automatic weighing of any material, whether liquid or solid, may be best described in connection with the weighing of materials used in bread making, in which flour and water are mixed in certain definite proportions.

Substantially the same form of apparatus may be employed in the weighing of liquids as that used for the weighing of solids, but the means for cutting off the supply to the weighing device is necessarily different in the two cases and may be varied to suit the conditions of supply. For feeding material to the weighing machine in the weighing of solids, it is preferable to employ conveyors operated by motors and to control the cut-off of supply of material by breaking the motor-operating circuit, by which the motors and the conveyors connected thereto are stopped. The means provided for automatically breaking the motor circuit comprises a switch so connected to the weighing device as to be operated thereby when the required amount of material has been supplied to the weighing apparatus.

In cases where a large quantity of material is to be weighed out in a comparatively small interval of time, as is required in the weighing of material for commercial baking, the greatest accuracy in the weighing is attained if provisions are made for supplying material rapidly at first and subsequently, near the end of the weighing operation, at a decreased rate. Obviously, if the material were supplied at the same rapid rate throughout the weighing operation, a considerable amount of the material would be in transit at the moment of cut off, which would be added to that in the weighing container and augment the quantity therein beyond the amount desired. By suitably providing means for decreasing the supply of material toward the end of the weighing operation and for cutting off the supply when the desired amount has been passed to the weighing hopper, any desired degree of accuracy may be attained in the weighing operation.

In the handling of liquids, it is preferable to cut off the supply to the weighing device by means of a valve or valves in the supply pipe, which may be accomplished by either mechanical or electrical means, although I preferably employ electrical means for this purpose.

The various features of the invention are illustrated in the accompanying drawings, showing a preferred embodiment of the invention and a modification thereof, in which—

Figure 1 is a view in elevation of an automatic weighing machine embodying my invention, illustrated in the form particularly adapted for the weighing of solids, and shown in connection with a mixing or kneading machine as applied to commercial baking;

Fig. 2 is a cross section of a portion of the weighing machine taken on the line 2—2 of Fig. 1 showing the arms or branches of the scale beam and the mode of supporting the hopper thereon.

Figure 12:
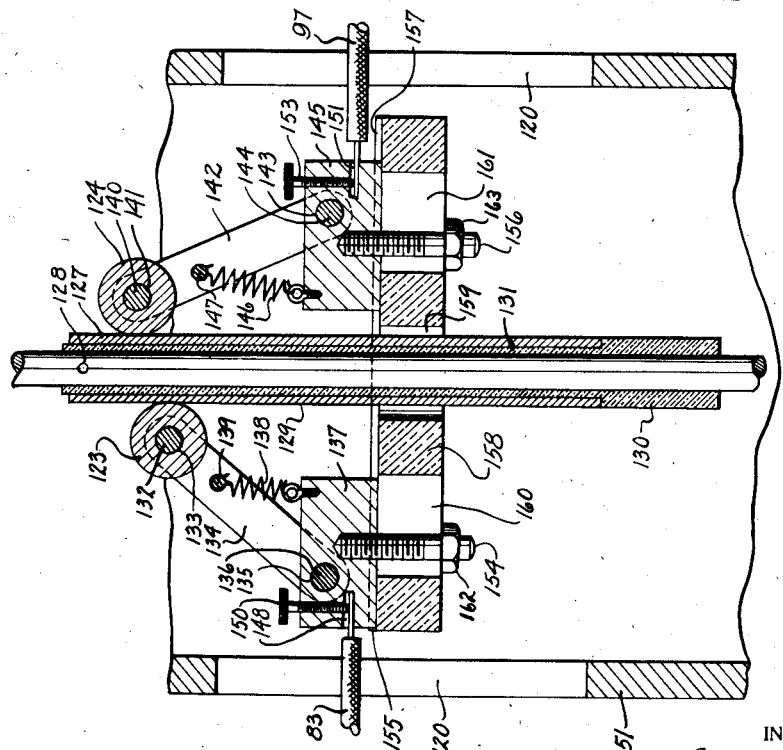

Fig. 3 is a view in elevation of the dial scale and pointer employed in connection with the machine, together with a switch box adapted to contain an arrangement for shutting off the supply of material passing to the weighing hopper;

Fig. 4 is a cross-sectional view through the dial scale casing showing the cut-off controlling means moved into a horizontal position;

Fig. 5 is a cross-sectional view of the device taken on the line 5—5 of Fig. 4;

Fig. 6 is a view similar to Fig. 5 taken on the section line 6—6 of Fig. 4;

Fig. 7 is a cross-sectional view taken on the section line 7—7 of Fig. 5;

Fig. 8 is a cross-sectional view taken on the section line 8—8 of Fig. 5;

Fig. 9 is a detail view partly in section, showing the mode of connecting the weighing rod to the end of the scale beam, and also the means for supporting the casing enclosing the weighing rod, the dial mechanism and switches, independently of the scale beam;

Fig. 10 is a wiring diagram or diagrammatic representation of the operating circuits for the motors which operate the conveying means, showing the relative positions of the switches for breaking the motor operating circuits to cut off the supply of material;

Fig. 11 is a sectional plan view of a modification of the means for interrupting or breaking the motor circuits by which the supply of material to the weighing means is decreased and stopped;

Fig. 12 is a cross-sectional view taken on the line 12—12 of Fig. 11; and

Figure 13:
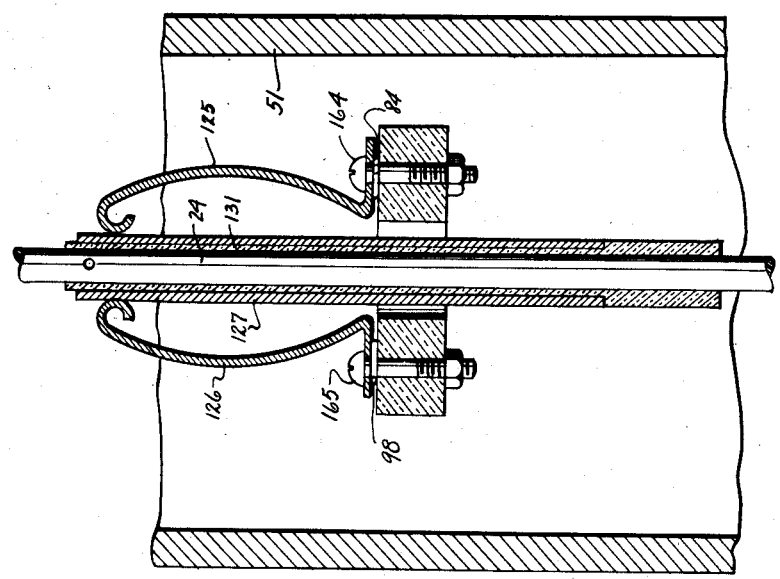

Fig. 13 is a view taken on the line 13—13 of Fig. 11.

Referring more particularly to the drawings, numeral 10 indicates a kneading machine adapted for mixing flour, water and other constituents of dough which may be supplied thereto from a weighing hopper 11 and a tank 12. The weighing hopper 11 is attached to a weighing machine by means of which flour or other material may be weighed out in predetermined quantities and discharged into the kneading machine. Similarly the tank 12 is attached to a weighing machine which in the present illustration may be employed for weighing out portions of water to be employed in the mixing or kneading machine. The weighing machine for the water may be arranged at right angles to the flour weighing machine for the sake of convenience, and the tank 12 may be provided with a double outlet pipe, each branch having a valve so that the same tank may be operated to serve two kneading machines, where a battery of machines is employed in a commercial installation. Both the weighing machines above referred to are preferably supported on or carried by a suitable framework 13 which may be attached, for example, to the ceiling 14 of the room containing the balances or weighing machines.

As the weighing machines for weighing the solids and liquids are substantially alike, it will be sufficient to describe the machine for weighing solid material and to describe only points of dissimilarity in connection with the apparatus for weighing liquids.

The weighing machine for weighing flour or other solid or comminuted material, comprises a weighing hopper 11 which is suitably suspended on the weight arm of a furcated scale beam 15 between the branches 16, 17 of which the weighing hopper is pivotally held on knife edges 18, 19, as indicated in Fig. 2 of the drawings. The branches of the scale beam are pivoted on a double fulcrum comprising knife edges 20, 21 held by means of brackets 22, 23 which are suitably attached to the framework 13, as indicated in Fig. 1 of the drawings. The weighing arm of the scale beam 15 is attached to a weighing rod 24 which is connected to extension springs 25, 26 by means of which a force proportionate to the weight applied is exerted on the weighing rod and is indicated or measured by suitable means such as a pointer adapted to pass over a dial scale, as shown in Fig. 1. The distance between the knife edge 18 and the fulcrum 20, or the corresponding knife edges 19 and 21, constitutes the weight arm of the balance, and the horizontal distance between the axis of the weighing rod 24 and the line through the points of support of the knife edges 20, 21 which forms the fulcrum of the balance, constitutes the power arm or weighing arm of the balance. The ratio between the weight arm and the weighing arm which I preferably employ is 1 to 16. With this proportion the resilient powers of the springs or the maximum tension required of the springs, taken together, is only one sixteenth the maximum load to be applied to the weighing hopper. By this means I attain a high degree of accuracy in weighing large quantities of material.

The hopper 11 is preferably cylindrical in shape in its upper portion and conical in its lower portion, and is provided at the bottom thereof with a chute or tube 27 made of flexible material, such as canvas, by means of which the material in the hopper may be directly discharged to the kneading machine after the weighing operation is completed. The passage of the flour or other material from the hopper to the kneading machine though the chute 27 is controlled by a valve or shutter 28, which is preferably operated by hand.

The flour or other material to be weighed off in predetermined quantities by the weighing machine may be stored in any convenient manner, but I preferably employ a bin 29, in a room above the weighing machine, for example, the form of the bin being such that the sides converge or slant inwardly at their lower ends, forming a long, narrow trough at the bottom thereof. The trough at the bottom of the bin 29 is preferably divided into two sections by means of a wall 30 forming two parallel compartments 31 and 32, from which material may be independently fed or conducted to a chute or conducting tube 33 which connects with the weighing hopper through a chute 34 made of suitable flexible material.

The bottoms of the compartments 31, 32 are preferably semi-circular in form and are provided with suitable outlets or openings 35 and 36 therein, communicating with the chute 33, as shown in Fig. 1 of the drawings. In the compartment 31 is a conveyor 37, and in the compartment 32 is a corresponding conveyor 38 by means of which material may be fed at any desired rate to the weighing hopper. The conveyors are preferably provided with troughs or suitable conveying sections, by means of which, when the conveyors are rotated, the material in the bin is gradually taken from the compartments 31 and 32 and fed to the conducting chute 33. In place of the form of conveyors illustrated, I may employ screw conveyors for feeding the material from the bin to the hopper.

The conveyors 37 and 38 are preferably of different size and are driven by motors 39 and 40 respectively, to which they are suitably geared, by means of which the speed of operation of the conveyors may be independently controlled within any desired limits. By the use of motors of different size, one of the conveyors may be operated to convey a large amount of material at a rapid rate to the weighing hopper for a predetermined interval of time to supply the greater portion of the material to be weighed out, and the remaining portion of the material may be supplied independently at a slow rate by the other conveyor by means of which the final weight in the weighing hopper may be accurately attained. The conveyor 38, which is preferably made larger than the conveyor 37 and adapted to supply the larger amount of material, may be operated satisfactorily at a speed of about 120 R.P.M., while the smaller conveyor 37 may be suitably operated at a speed of approximately 32 R.P.M.

The flour coming from the bin 29 may be sifted, if desired, before entering the weighing hopper 11, and for this purpose a sifting machine may be interposed in the tube 33 or positioned at the outlets 35, 36 from the compartments 31 and 32.

The weighing end, or stem, of the scale beam 15 is connected to the weighing rod 24 by any suitable connecting means such as a link 41, to which it may be pivotally attached by a suitable pin or bolt 46. The link 41 is preferably adjustably attached to the upper end of the weighing rod 24 by a screw-threaded connection, the rod having a screw-threaded portion 42 adapted to pass through a corresponding threaded opening 43 in the link and held in place by nuts 44, 45, which serve to lock it in position upon the link. The weighing rod 24 is suitably protected by means of a housing consisting preferably of three parts, an upper casing or portion 47 of which is rigidly attached to the framework 13 by any suitable means such as brackets or adjustable connections 48, 49, and in which is an opening 50 of suitable dimensions to permit the oscillations of the scale beam 15 without interference with the weighing operation. Connected to the lower end of the casing 47 or integral therewith, if desired, is a casing 51 within which may be provided suitable means for automatically discontinuing the operation of the motors at predetermined intervals, as will be hereinafter described. To the lower end of the casing 51 is attached a dial scale casing 52 adapted to contain the mechanism for indicating the weight of material in the hopper 11, and also the mechanism for regulating or determining the point of cut off during the supply of material to the weighing device. The dial scale is accordingly provided with two hands, or pointers, one for indicating the weight required, which is adapted to cooperate with the cut off mechanism, and the other for indicating the actual or instantaneous weight of material in the weighing hopper.

The weighing rod 24, which extends through the casings 47 and 51 into the casing 52, is preferably connected to the springs 25, 26 through a plate 53 to which the weighing rod and the springs are connected. The springs 25, 26 may be connected to the plate 53 by means of hooks 54, 55 attached to the plate, and may be attached to or held by a crossbar 56 connected to the casing 52 by screws 57, 58, for example, the springs being adjustably connected by means of hooks 59, 60 to the bar 56 and held in adjusted position by means of screw nuts 61, 62, as shown in Fig. 5. The weighing rod 24 may be connected to the plate 53 by any preferred form of fastening means such as hooks 63, 64, by means of which the plate may be readily disconnected from the rod.

The means for indicating the weight in the weighing hopper, which comprises a pointer 65 arranged to move over a dial 66, is operatively connected to the weighing rod 24 and moves in accordance with the extension of the springs 25, 26. The pointer 65 is fastened by means of a lock nut, or in any other suitable way, to a hollow shaft 67 which is supported by and turns on a solid shaft 68, whose axis lies substantially at the center of the dial scale 66. The shaft 68 is supported at one end in the bearing 69 which is fixed in the rear wall of the casing 52, and at its other end in the hollow shaft 67, which in turn is supported in the bearing 70 fixed in the front wall of the casing 52. The shaft 67 is held in position on the solid shaft 68 by means of suitable collars, as indicated in Fig. 4 of the drawings. The solid shaft 68 is held in position in the casing by means of the pinion 92, to which it is attached on one side of the bearing 69, and the arm 93 on the opposite side of the bearing 69. The bearings 69 and 70 might be supported in cross pieces attached to the casing 52, although I prefer the construction above described as supporting means for the bearings.

In order to provide for the movement of the pointer 65 over the scale 66 in accordance with the weight in the hopper, I preferably connect a pinion 71 to the shaft 67 to which the pointer is connected, and provide a rack 72 adapted to move with the movements of the springs 25, 26 and the weighing rod 24, and to mesh with the pinion 71 throughout the range of movement of the rack, thereby turning the pointer in proportion to the extension of the springs or to the weight in the weighing hopper.

For the purpose of eliminating friction as much as possible and to attain flexibility in the operation of the indicating means, I preferably attach the rack 72, by means of a pivot or pin 73, to a suitable support or lug 74 attached to the plate 53, which serves as the holding means for the upper ends of the springs 25, 26. In order to maintain the rack in operative contact with the pinion 71, I provide a spring 75 attached at one end to the rack 72 and connected at its other end to a screw or other holding means in the plate 53.

The scale 66 may be calibrated in accordance with applied known weights and any desired degree of accuracy may thereby be attained in the weighing operations. The front of the dial scale box is preferably covered with a glass plate so as to protect the scale and pointer.

The zero position of the pointer 65 on the dial scale 66 may be adjusted for no load by counter-balancing the weight of the weighing rod 24 and the parts attached thereto including the springs 25, 26, when the weighing hopper 11 is empty and in position on the scale beam 15. This adjustment may be accomplished by first fixing the position of a counter weight 76, at the end of the scale beam 15, and thereafter adjusting the position of a second counter weight 77, which is mounted on a screw rod 78, positioned in a bracket at the forward end of the scale beam, as shown in Fig. 1 of the drawings. The zero position of the pointer on the dial scale is further regulated or adjusted by regulating the length of the weighing rod 24, which is accomplished by adjusting the position of the weighing rod 24 in the link 41 by regulating the position of the screw nuts 44 and 45 at the top of the rod, and also by fixing the position of the springs 25, 26 in the dial scale casing by means of the screw nuts 61, 62, which control their position in the casing. It may be found necessary to adjust the position of the pointer 65 upon the shaft 67 after other adjustments have been made, which may be readily accomplished with the usual form of construction.

In the preferred form of my invention, in which the supply of material to the weighing device is to be decreased toward the end of the weighing operation, I employ two conveyors or supply means, as above described, which are simultaneously operated to supply the major portion of the material to be supplied; the supply is then decreased by automatically stopping or discontinuing the operation of one of the supply means, and means are provided for discontinuing the operation of the other supply means when the total amount which has been supplied corresponds with the amount which is desired or that indicated upon the dial scale at which cut-off is to take place.

It was stated above that the means employed for automatically discontinuing the operation of the motors, to cut off the supply of material, were preferably contained within the casing 51 between the weighing rod casing 47 and the dial scale casing 52. The means which I employ to independently stop the motors comprises in effect a pair of switches, one in each motor circuit, together with means connected to the weighing rod for automatically opening the switches when a predetermined amount of material has been supplied. In the housing 51 I provide disks or other suitable means for supporting the circuit terminals of the motor operating circuits, which comprise two pairs of plates 79, 80, and 81, 82. In circuit with the larger motor 40, I employ the plates or circuit terminals 79 and 80, and in circuit with the smaller motor 39, I employ the second pair of terminals 81, 82. The plates 79, 80 are suitably connected to leads 83, 84 of the motor circuit of motor 40 by binding screws or other connections 85, 86. The leads preferably pass out of the casing 51 through suitable longitudinal slots 120. The plates 79, 80 are preferably supported upon a disk 87 of suitable non-conducting material, which is so supported that it may be held in any desired position, preferably by means of a rod 88 attached to the disk by means of a bracket 89 and held in a guide or tube 90, which may be attached to the dial casing in any suitable manner as by means of a set screw 107 at the neck of the dial casing, and to the cross bar 56 by means of set screws 108 and 109. In order to adjustably hold the rod 88 and the terminals 79, 80 in any desired position and thereby to regulate the point of cut off as will be fully explained, I provide a pinion 91, which may be keyed or otherwise fastened on the shaft 68, and a rack upon a portion of the rod 88 which is adapted to be in operative contact with the pinion through a suitable lateral opening 92 in the tube 90, as illustrated in Fig. 6 of the drawings. Attached to the shaft 68 and preferably extraneous to the dial casing 52 is an arm 93 by means of which the rod 88, operated through the pinion 91 on the shaft may be set in any desired position. The arm 93 may be secured or fastened in any desired position by means of a set screw 94.

In order to make and break the circuit between the terminals 79, 80, I provide a conducting member 95, preferably in the form of a circular ring which is adapted to be brought in and out of contact with the circuit terminals by means attached to the weighing rod 24 held in position around the weighing rod. Means are provided for insulating the conducting member 95 from the weighing rod 24 and at the same time permitting the upward and downward movement of the weighing rod without interference with the contact between the switch terminals and the conducting member. For this purpose I preferably employ a cylinder or tube 110 of insulating material, which prevents the conducting plate from moving or being displaced laterally out of contact with the circuit terminals.

The weighing rod 24 preferably carries a lifting member or bracket 96 of insulating material, which is rigidly attached thereto and lifts the conducting member or switch blade 95 from the terminals when the weighing rod has moved upwardly a sufficient distance, depending upon the set or position of the terminals 79, 80 and the load applied in the hopper. By the lifting of the contact plate 95 the circuit through the motor 40 is broken and the corresponding conveyor 32 is thereby stopped in the predetermined position of the weighing rod which corresponds to a predetermined load in the weighing hopper.

As the contact plate 95 and the tube 110 are to be fully raised during the weighing operation, their weight, although small, cannot be neglected without introducing error into the weighing operation. The weight of the contact plate 95 and the tube 110 attached thereto are therefore preferably counterbalanced by a weight added to the weighing arm, preferably on the hopper. The weight necessary for counterbalancing this weight is obviously in the ratio of the weighing arm to the weight arm. For example, in the case where the ratio of the weight arm to the weighing arm is one to sixteen, the counterbalancing weight which is required for counterbalancing will be sixteen times the combined weight of the plate and tube. By thus counterbalancing the weight, or by setting the arm 93 so as to compensate for this weight, the error which would otherwise be introduced into the weighing is eliminated.

In order to break the circuit through the smaller motor 39 and thus to stop the smaller conveyor 37, I provide a second switch comprising the terminal plates 81 and 82 and a conducting member 99 in circuit with the motor 39 through the leads 97, 98. The leads which pass outwardly through the slots 120 in the casing 51 are connected to the conducting plates 81, 82 by suitable binding screws 100, 101, which serve also to hold the terminals in position on an insulating plate 102. The insulating plate 102 is preferably annular in form, and is supported in position by means of four insulating posts or rods 103, 104, 105 and 106, as indicated in Fig. 7. Around the central opening of the disk 102 is a cylindrical tube 123' which is of sufficient size to permit the tube 110 and the annular disk or flange 121 to pass upwardly therethrough.

During the operation of the motor 39, the conducting member 99, which is preferably in the form of an annular plate similar to the plate 95, rests upon the terminals 81, 82, completing the circuit therethrough. The plate 99 is preferably insulated from the weighing rod 24 by means of a cylinder or tube 111 which is of sufficient size to permit movements of the weighing rod therein without interference with the weighing operation. In order to provide means for breaking the contact between the conducting member 99 and the circuit terminals 81, 82, I preferably provide an annular disk or projecting portion 121 at the top of the insulating tube 110, which extends laterally a sufficient distance to contact with and lift the conducting plate 99 when the tube 110 is raised, together with the conducting plate 95, by means of the member 96 on the weighing rod. By this means the second motor 39 and the corresponding conveyor 37 may be stopped at any predetermined position of the weighing rod, or at any predetermined point after the operation of the first switch, depending upon the set of the arm 93 and the height or position of the tube 110.

In order to provide means for varying the height of the tube 110 and thus to conveniently regulate the relative points of cut off of the two motors, I preferably provide the tube with a screw threaded portion 119 which is fitted into a corresponding screw threaded portion in the conducting member 95, as indicated in Fig. 5 of the drawings. By this means the relative points of cut off may be readily adjusted by simply screwing or turning the tube into the desired position.

It will of course be understood that other forms of devices for opening and closing the motor circuits and which fall within the scope of the appended claims may be resorted to without departing from the invention. I prefer, however, to employ the construction above described and illustrated, which is simple in operation and easily adjusted. By adjusting the position of the arm 93 to control the final cut off of supply at any predetermined point on the dial scale 66, as indicated by a pointer 112 attached to the arm, the point of cut off of the first conveyor will take place automatically at a predetermined interval before the final cut off, depending upon and regulated by the length of the tube 110 employed, and the final cut off will occur at the point on the dial scale designated by the pointer.

The mode of connecting the motors and the circuit breaking means in circuit with a source of electrical energy will be apparent to those skilled in the art, but for purposes of illustration a wiring diagram is shown in Fig. 10, including the principal connections.

The numeral 113 indicates a source of electrical power to which mains 114 and 115 are connected. From the lead 115, a wire 116 is connected with the larger motor 40 and a wire 84 leads from this motor to the switch having the terminals 79, 80, and the conducting member or switch blade, 95, and from thence through the wire 83 and starting box 122 to the wire 114 and back to the source of power. A branch wire or lead 117 connects the motor 39 to the main 115 and the wire 118 connects the motor with the main 114 through the starting box 122 and the switch or shutting off device for motor 39, comprising the terminals 97, 98 and the conducting member 99.

When the weighing operation is to be commenced, the two motors 39 and 40 are started together by operating the lever of the starting box 122, which is in circuit with both motors as indicated in the wiring diagram. During the operation of the weighing apparatus the motors 39 and 40 operate as long as the conducting members or switch blades 95 and 99 remain in contact with their respective switch terminals. When the load in the weighing hopper or container attached to the weight arm of the balance attains a predetermined amount depending upon the adjustments in the balance, the conductor 95 is lifted, breaking the circuit across the terminals 79, 80 and thus causing the motor 40 and the conveyor connected thereto to stop. Thereafter the motor 39 continues operating until the conductor 99 is finally lifted, breaking the motor circuit through the terminals 81, 82 and causing the motor and the conveyor attached thereto to stop, which will occur at the predetermined point corresponding to the set of the arm 93 determining the point of final cut off.

It will be apparent to those skilled in the art that the device may be proportioned or designed to attain any desired speed of operation and variation in the points of cut off. In operating the apparatus for the supply of flour to be used in a mixing or kneading machine, rates of supply of the conveyors and the points of cut off of the motors are preferably so adjusted that the desired quantity may be supplied in five minutes, the point of cut off of the first motor taking place about one half minute before the final cut off.

It will of course be understood that the foregoing described apparatus may with slight modifications be applicable to the weighing of liquids without departing from the spirit of the invention. Furthermore with slight changes in the means controlling the motors this means may be adapted to control a single motor of the variable speed type, the speed of which may be gradually reduced as the volume of the material weighed increases until the rate of supply is so slow that the final desired weight is very accurately attained.

In place of the means above described for breaking the circuits to the motor operating the conveyors, I may employ the form of device illustrated in Figs. 11, 12 and 13, by means of which the conveyors may be stopped at different predetermined times. The modified arrangement comprises metallic rollers 123 and 124, and curved metallic springs 125 and 126 which contact on opposite sides with a cylindrical tube 127 surrounding a portion of the weighing rod 24 and are so disposed as to make contact with and press gently against the cylindrical tube or rod. The tube 127 which is composed of two sections joined together may be attached to the weighing rod 24 by means of a pin 128, for example at the upper portion of the tube. The upper and longer section 129 of the tube 127 is made of metal or other suitable conducting material, and the lower and shorter portion 130 of the tube may be made of any suitable non-conducting material, the sections having preferably the same external diameter so as to form a continuous uninterrupted surface. The conducting portion of the tube is preferably made of a thin metal, and the space between the weighing rod and the tube is preferably filled with a non-conducting material forming a coaxial non-conducting tube or section 131. The roller 123 is preferably provided at each side with a shaft or with trunnions 132, which are held in bearings or openings 133 in the upper ends of parallel supporting bars 134, which are pivotally supported upon a block 137 by means of a pin 136 which passes through corresponding openings 135 in the block and bars. The roller 123 is pressed against the tube 127 by means of a spring 138, which is fixed at one end to the top of the block 137, and is fixed at its other end to a suitable rod or other supporting means 139, connected to the bars 134. The roller 124 is supported in a manner similar to that of the roller 123 by means of shafts or trunnions 140 carried in bearings or openings 141 in parallel supporting bars 142, which are supported upon a metal block 145, to which it is pivotally attached by means of a pin 144 passing through openings 143 in the bars and the metal block. The roller 124 is pressed against the tube 127 by means of a spring 146 attached at its lower end to the metallic block 145 by a set screw or other suitable means, and at its upper end to a rod or pin 147 extending between and fixed to the bars 142. The metal blocks 137 and 145 are provided with suitable openings 148 and 151 respectively, in which lead wires may be held by means of set screws 150 and 153, or other suitable holding means. The blocks 137 and 145 are preferably supported upon an adjustable base plate 158, made of suitable non-conducting material, which may be attached to the rod 88, in order to regulate its position to determine the point of cut off of supply of material, in a manner similar to that indicated in Fig. 6 of the drawings. By means of the rod 88 the cut-off device may be held in any position corresponding to any load indicated on the dial by the pointer 112 on the arm 93 (see Fig. 4), by means of which the final cut-off of the supply means will take place so as to attain a final weight corresponding to the position of the pointer. The block 137 may be fastened in any desired position upon the base plate by means of a screw bolt 154 attached to the block and passing through a slot 160 in the base plate 158, and the block 145 may be similarly fastened to the base plate by means of a screw bolt 156 which passes through a slot 161 corresponding to the slot 160 in the base plate. The blocks are preferably held in suitable grooves 155 and 157 in the base plate by means of which the blocks may be maintained in alinement on opposite sides of the weighing rod and readily attached in any desired position. The base plate 158 is provided with a central opening 159 of a sufficiently large diameter so as not to come into contact with the weighing rod or the tube attached thereto in any position of the weighing rod. By means of the arrangement for fastening the blocks 137 and 145 on the base plates, the circuits through the motors may be interrupted at any predetermined point and a corresponding cut-off of the supply means is thus provided for to take place at any predetermined point, as will be hereinafter more fully explained. The slots 160 and 161 are preferably arranged radially with regard to the tube 127, the slot 160 being preferably located in the base plate in alignment with the groove 155, and the slot 161 is preferably similarly located in a corresponding position with respect to the block 151, as is indicated in Fig. 11 of the drawings. The screw bolts 154 and 156 are preferably attached to the blocks 137 and 145 at right angles thereto so as to maintain a position parallel to that of the weighing rod, and screw nuts 162 and 163 are provided to fasten the blocks in position. By suitably fastening the blocks in place in a position along the slots 160 and 161, the vertical distance between the points of contact of the rollers 123 and 124 on the conducting tube 129 may be regulated by means of which the relative time of cut-off of the supply devices may be regulated.

The rollers 123 and 124, which are adjustable in position as above described, comprise one circuit terminal of the motors 39 and 40, the roller 123 being in circuit with the larger motor 40 which is to be operated during only a portion of the period of supply, and the roller 124 being in circuit with the smaller or weaker motor 39, which is to be operated during the whole period of supply. In order to provide the second circuit terminal for the motors, I preferably employ springs 125 and 126 positioned upon opposite sides of the tube 127 and connected to lead wires of the motor circuits, as shown in Fig. 11 of the drawings. The spring 125 is attached to the base plate 158 by means of a screw bolt 164, and the spring 126 is similarly attached to the base plate by means of the screw bolt 165. The springs 125 and 126 are preferably of equal length, thickness, curvature and resiliency so as to press against the tube 127 with equal force. The points at which the springs 125 and 126 touch the tube are preferably above the point of contact of the rollers 123 and 124 therewith so that in the upward movement of the weighing rod, and tube 127 attached thereto, the rollers will move out of contact with the metallic portion 129 before the springs 125, 126 pass out of contact therewith, the rollers passing on to the non-conducting tube 130 and leaving the springs 125 and 126 in contact with the metal portion 129 of the tube. The lead wires 83 and 84, which are connected in circuit with the motor to be first cut out, are attached respectively to the terminals connected to the roller 123 and spring 125. Similarly the lead wires 97 and 98 are respectively attached to the terminals connected with the roller 124 and the spring 126. The lead wires 83, 84, and the wires 97, 98, pass out of the casing 51 through the vertical slot 120, which is of sufficient length to permit the desired latitude of movement to enable adjustment in any desired position of cut-off between zero and full load.

The position of the tube 127 attached to the weighing rod 24 with respect to the rollers 123 and 124 shown in Fig. 12 of the drawings, is that corresponding to no load position, or the position before the operation of the conveyors has been initiated.

In the operation of the device, the arm 93 is moved into the position where the pointer 112 indicates the load desired to have supplied to the weighing hopper. The device is then put into operation by closing the starting switch or operating the starting box of the motor circuits. The conveyors connected to the respective motors will then supply material from the bin 29 to the weighing hopper 11, and the pointer 65 will move around the dial scale 66 in accordance with the weight of material supplied.

The weighing rod 24 will move upwardly as the load is applied until the roller 123 moves out of contact with the metallic tube 129 on the weighing rod, and passes on to the non-conducting portion 130 which breaks the circuit through the motor 40 and stops the corresponding conveyor 38. Thereafter, the material is supplied to the hopper 11 by means of the conveyor 37 alone, resulting in a great decrease in the rate of supply to the hopper, and accordingly an increase in the accuracy with which the final weight is attained. When the pointer 65 reaches the position on the dial 66 corresponding to the point at which the arm 93 is set for cut-off, the roller 124 will move off the tube 129 on to the non-conducting tube 130, thus breaking the circuit through the motor 39 and stopping the operation of the conveyor 37. After the circuits through the motors 39 and 40 have been both broken in the manner above described, the handle of the starting box 122 returns automatically to the inoperative or open circuit position. When the material is drawn from the hopper 11 and the weighing rod returns to the position corresponding to no-load, the portions of the circuits including the rollers 123 and 124 and the metallic tube are again closed and the weighing device may be operated again by merely drawing the handle of the starting box into operative or starting position. In emptying the hopper 11, the point at which all the material has left the hopper is readily determined by inspecting the pointer 65, which will indicate zero on the dial scale when the hopper is empty.

It is to be understood that various changes or modifications may be made in the details of construction of the weighing device, as will be apparent to those skilled in the art, without departing from the spirit or scope of the invention as defined in the claims. For example, the device which has been described above for breaking the electric current may be employed for simultaneously breaking two motor circuits, as the motor for operating the sifting machine and that operating a conveyor, and the same device could be employed for starting a motor, or for energizing or de-energizing electromagnets, or for throwing pulleys or gears into or out of gear, or for the operation of valves or shutters. It is contemplated, therefore, and it is to be understood, that the claims cover the equivalent means for accomplishing the desired results, which have been described in connection with the preferred embodiment of my invention, and the modification thereof for purposes of illustration.

Having thus described the invention, what is claimed as new is:

1. In a weighing machine, a weighing mechanism inclduing a material receiving hopper, a plurality of means for feeding the material to be weighed to said hopper at different rates of speed, operating means for each of said feeding means, separably operated control means for each of said operating means, and means for operating said last mentioned control means, said means including an element of the first mentioned control means.

2. In a weighing machine, a weighing mechanism including a material receiving hopper, individually operated mechanisms for feeding material to be weighed to said hopper, an operating mechanism for each of said feeding mechanisms, a controlling means for each of said operating mechanisms, and means operating one of said controlling means to render one of the feeding mechanisms inoperative, and subsequently operate the other controlling means through the medium of an element of the first mentioned control means to render the remaining feed mechanism inoperative.

3. In a weighing machine, a weighing mechanism including a material receiving hopper, electrically operated feeding mechanisms for delivering materials to be weighed to said hopper, a controlling means for rendering each of said electrically operated feeding mechanisms inoperative during a weighing operation, and means associated with the weighing mechanism for operating said controlling means, said controlling means being adjustable with respect to its operating means whereby the operation of one of said controlling means may be had at a predetermined point in the weighing operation.

4. In a weighing machine, a hopper for receiving the materials to be weighed, independent feeding mechanisms for delivering the materials to be weighed to said hopper, at different rates of speed, an electric motor for operating each of said material feeding mechanisms, a control element in the circuit of each of said motors, and serving to open and close the circuit thereof, means permitting the adjustment of said control elements relative to the weighing mechanism for predetermining the point of operation of the control elements during the weighing operation and means associated with the weighing mechanism for successively operating said control elements.

5. In a weighing machine, a hopper for receiving the materials to be weighed, independent feeding mechanisms for delivering the materials to be weighed to said hopper, at different rates of speed, an electric motor for operating each of said material feeding mechanisms, a control element in the circuit of each of said motors, and serving to open and close the circuit thereof, means permitting the adjustment of said control elements relative to the weighing mechanism for predetermining the point of operation of the control elements during the weighing operation, and means operated by movement of the material receiving hopper for successively operating said control elements during a weighing operation.

6. In an automatic electrically operated weighing machine, a weighing mechanism including a hopper for the reception of the materials to be weighed, a plurality of conveyors for delivering material to be weighed to said hopper at different rates of speed, a motor for operating each of said conveyors, a circuit for each of said motors, a circuit breaking means in each of said circuits, means carried by the weighing mechanism for operating one of said circuit breaking means, and means carried by the initially operated circuit breaking means for operating the second mentioned circuit breaking means.

7. In an automatic electrically operated weighing machine, a weighing mechanism including a hopper for the reception of the materials to be weighed, a plurality of conveyors for delivering material to be weighed to said hopper at different rates of speed, a motor for operating each of said conveyors, a circuit for each of said motors, a circuit breaking means in each of said circuits, means carried by the weighing mechanism for operating one of said circuit breaking means, and means carried by the initially operated circuit breaking means for operating the second mentioned circuit breaking means, the means carried by the initially operated circuit breaking means being adjustable with respect thereto and with respect to the second operated circuit breaking means.

8. In a device of the class described, a weighing machine, a weighing hopper connected to said weighing machine, means for conveying material at a predetermined rate to said weighing hopper, a second means for conveying material to said weighing hopper at a fixed rate less than that of the first conveying means, a dial scale and pointer operatively connected to said weighing machine for indicating the instantaneous weight of material in said hopper, means for indicating the amount desired to be supplied to said weighing hopper, means for discontinuing the operation of the first conveying means when a predetermined amount of material less than the indicated desired amount has been supplied to said weighing hopper, means for discontinuing the operation of the second conveying means when the amount of material in said weighing hopper attains the indicated desired amount, the said means for discontinuing the operation of the conveying means being mechanically interconnected with said means for indicating the desired weight as to attain final cut-off at the indicated desired point, and means for relatively varying the points of cut-off of the conveying means to attain cut-off of the first conveying means at any predetermined point before the final cut-off.

9. In an automatic electrically operated weighing machine, a weighing mechanism including a hopper for the reception of the materials to be weighed, a plurality of conveyors for delivering material to be weighed to said hopper at different rates of speed, a motor for operating each of said conveyors, a circuit for each of said motors, a circuit breaking means in each of said circuits, means carried by the weighing mechanism for operating one of said circuit breaking means, and means carried by the initially operated circuit breaking means for operating the second mentioned circuit breaking means, the means carried by the initially operated circuit breaking means being adjustable with respect thereto and with respect to the second operated circuit breaking means, and comprising a member of non-conducting material interposed between the two circuit breaking means and having screw threaded engagement with the circuit breaking means to which it is secured.

10. In an automatic weighing device, a balance having a weight arm and a weighing arm, a container connected to said weight arm, a weighing rod connected to said weighing arm, means for conveying material to said container, a motor connected to said conveying means, and means for breaking the electric circuit through said motor to automatically discontinue the operation of the conveying means, comprising switch terminals, a conductor adapted to convey current across said terminals, and means connected to said weighing rod for moving the conductor out of contact with said terminals when a predetermined amount of material has been supplied to said container.

11. In a device of the class described, a balance, a container connected to said balance, indicating means connected to said balance to indicate the weight of material in said container, a conveyor adapted to convey material to said container, a motor, means for operatively connecting said motor to said conveyor, a switch in the operating circuit of said motor, a second conveyor adapted to convey material to said container, a second motor, means for operatively connecting said second motor to said second conveyor, a second switch, said switch being connected in the operating circuit of said second motor, means for indicating the desired weight of material to be supplied to said container, means operatively connected to said balance for opening the first switch at a predetermined point before the desired amount of material has been supplied to said container, and means operatively connected with the first opening means for opening said second switch to stop the second motor and conveyor connected thereto when the weight of material in said container reaches the indicated desired weight.

12. In an automatic weighing machine, a weight arm and a weighing arm, a container supported on said weight arm, a weighing rod connected to said weighing arm, an extension spring connected to said weighing rod adapted to balance the weight of material supplied to said container, a dial scale, means for supporting the dial scale, a pointer adapted to move over the dial scale, means for operatively connecting the pointer to the weighing rod to cause movements of the pointer in accordance with the weight of material supplied to said container, means for indicating upon the dial scale the weight of material desired to be supplied to said container, means for automatically supplying material to the said container, and means for automatically stopping the supply of material when the said pointer reaches the indicated desired weight upon the dial scale.

13. In an automatic weighing machine, a weight arm and a weighing arm, a container supported on said weight arm, a weighing rod connected to said weighing arm, spring means connected to said weighing rod to balance the weight of material supplied to said container, means operatively connected to said weighing arm for registering the weight in said container, means for automatically feeding material to the said container, means for automatically decreasing the rate of supply of material to said container when a predetermined amount has been supplied thereto, means for indicating upon a scale the amount of material desired to be supplied to said container, means connected to said indicating means for automatically stopping the supply of material when the amount supplied to said container attains the indicated desired amount, and means operatively connecting said indicating means with the means for stopping supply, whereby cut-off will occur at any desired point corresponding to the indicated desired amount.

14. In a weighing machine, a dial scale, a pointer mounted to move over said dial scale, a weighing rod connected to the weighing arm of the weighing machine, a pinion connected to said pointer, a rack mounted to move with said weighing rod and to engage said pinion so as to move said pointer over said dial scale in accordance with the movements of said weighing rod, a pair of switch terminals, a second rack, means for connecting said second rack to said terminals, a guide for said second rack, a second pinion, said pinion being adapted to engage said second rack, a shaft connected to said second pinion, an arm operatively connected to said shaft so as to turn said shaft and pinion and thereby adjust the position of said rack and terminals, means for locking said arm in any desired position whereby said terminals are fixed in a corresponding position, a movable conducting member adapted to contact with said terminals, and means operating with movements of said weighing rod for moving said conducting member out of contact with said terminals, thereby breaking a circuit through said terminals.

15. In a weighing machine, a dial scale, a pointer mounted to move over said dial scale, a weighing rod connected to the weighing arm of the weighing machine, a pinion connected to said pointer, a rack mounted to move with said weighing rod and to engage said pinion so as to move said pointer over said dial scale in accordance with the movements of said weighing rod, spring means operatively connected to said weighing rod to apply a force to the weighing rod to balance the weight on the weight arm of the weighing machine, a plurality of pairs of superimposed switch terminals, a conducting member for each pair of terminals, adapted to contact therewith, means operating with movements of said weighing rod for moving the conducting member out of contact with the lowest pair of terminals, means connected to the conductors below the uppermost conductor for moving the next higher conducting member out of contact with its corresponding pair of terminals, and means for adjusting the position of the said means connected to the conductors whereby the moving of the various conducting members out of contact with the corresponding switches may take place relatively in any desired manner with movements of said weighing rod.

16. In an automatic weighing machine, a weight arm and a weighing arm, a container attached to said weight arm, a weighing rod connected to said weighing arm, spring means connected to said weighing rod to balance the weight of material passed to said container, a dial scale, a pointer mounted to move over said dial scale, a pinion connected to said pointer, a rack adapted to move with said weighing rod and to engage said pinion so as to move said pointer over said dial scale in accordance with movements of said weighing rod, a conveyor adapted to convey material to said container, a motor adapted to operate said conveyor, a pair of switch terminals in circuit with said motor, means for mounting said terminals in proximity to said weighing rod, said mounting means comprising a rack rigidly connected to said terminals, a guide for said rack, a pinion adapted to engage said rack, a shaft connected to said pinion, an arm operatively connected to said shaft by means of which said terminals may be adjustably held in any desired position, means for holding said arm in a fixed position, a movable conducting member adapted to contact with said terminals, and means connected to said weighing rod for moving said conducting member out of contact with said terminals to break the motor operating circuit.

17. In an automatic weighing machine, a weight arm and a weighing arm, a container attached to said weight arm, a weighing rod connected to said weighing arm, spring means connected to said weighing rod to balance the weight of material passed to said container, a dial scale, a pointer mounted to move over said dial scale, a pinion connected to said pointer, a rack adapted so as to move with said weighing rod and to engage said pinion so as to move said pointer over said dial scale in accordance with movements of said weighing rod, a conveyor adapted to convey material to said container, a motor adapted to operate said conveyor, a pair of switch terminals in circuit with said motor, means for mounting said terminals in proximity to said weighing rod, said mounting means comprising a rack rigidly connected to said terminals, a guide for said rack, a pinion adapted to engage said rack, a shaft connected to said pinion, an arm operatively connected to said shaft by means of which said terminals may be adjustably held in any desired position, means for holding said arm in a fixed position, a movable conducting member adapted to contact with said terminals, means connected to said weighing rod for moving said conducting member out of contact with said terminals to break the motor operating circuit, a second conveyor adapted to convey material to said container, a second motor, said second motor being operatively connected to said second conveyor, a second pair of switch terminals, said second switch terminals being connected in circuit with said second motor, means for relatively adjusting the position of said last named terminals with respect to the first named terminals, a second conducting member, said second member being adapted to contact with said second terminals, and means operatively connected to the first conducting member for moving said second conducting member out of contact with said second terminals at a predetermined time after said first conducting member has been moved out of contact with the corresponding terminals.

18. In an automatic electrically operated weighing machine, a weighing mechanism including a hopper for the reception of the material to be weighed, a plurality of means for feeding material to said hopper at different rates of speed, separate operating means for each of said feeding means, and including an electric motor, and a circuit therefor, a circuit controlling element in each of said circuits, means carried by the weighing mechanism for operating one of said circuit controlling elements to render one of the motors and its associated feeding mechanism inoperative, and means carried by said circuit controlling element for operating the other circuit controlling element upon continued operation of the weighing mechanism, said means being carried by the initially operated circuit controlling element, and adjustable to and from said second operated controlling element for relatively varying the operation of the circuit controlling elements.

19. In an automatic weighing machine, a container for receiving the material being weighed, a plurality of separate feeding mechanisms for feeding the material to be weighed to said container, independently operating driving means for driving said feeding mechanisms at different speeds and means operable by the position of the material-receiving container for successively rendering the feed mechanism driving means inoperative.

20. In an automatic weighing machine, a container for receiving the material being weighed, a plurality of feeding mechanisms for feeding the material to be weighed to said container, independently operating driving means operable simultaneously for driving said feed mechanisms, and means operable by the position of the material receiving container for successively rendering the feed mechanism driving means inoperative.

21. In an automatic weighing machine, a container for receiving the material being weighed, a plurality of feed mechanisms for feeding the material to be weighed to said container, independently operating driving means operable simultaneously for driving said feed mechanisms at different speeds, and means operable by the position of the material receiving container for successively rendering the feed mechanism driving means inoperative.

Signed at Saginaw, Michigan, this 31st day of December, 1923.

EUGENE GASE.